United States Patent [19]

Barefoot

[11] 3,853,666

[45] Dec. 10, 1974

[54] METHOD AND APPARATUS FOR RETREADING TIRES

[76] Inventor: Carlton Keith Barefoot, Muncie, Ind.

[22] Filed: Dec. 18, 1972

[21] Appl. No.: 316,353

Related U.S. Application Data

[62] Division of Ser. No. 52,534, July 6, 1970, Pat. No. 3,729,358.

[52] U.S. Cl.................... 156/394, 156/128, 156/96, 425/17, 425/19, 425/22, 264/315, 264/326, 264/36
[51] Int. Cl....................... B29h 5/02, B29h 17/36
[58] Field of Search.......... 425/22, 17, 19; 156/128, 156/96, 128 I, 123, 394, 394 FM; 264/3, 15, 326, 36

[56] References Cited
UNITED STATES PATENTS

| | | | |
|---|---|---|---|
| 2,534,845 | 12/1950 | Woods | 425/17 |
| 2,987,770 | 6/1961 | Powell | 425/23 |
| 3,135,996 | 6/1964 | Smyser | 425/22 |
| 3,236,709 | 2/1966 | Carver | 156/96 |
| 3,590,433 | 7/1971 | Rawls | 425/19 |

*Primary Examiner*—Clifton B. Cosby
*Attorney, Agent, or Firm*—Owen & Owen

[57] ABSTRACT

The invention is a method and apparatus for bonding and shaping retread stock to a tire casing. A pair of circumferentially mating mold elements engage the tread area of a tire to be retreaded. The molds are divided along a horizontal mating plane and are supported in aligned relationship within a pair of substantially hemispherical pressure chamber members adapted for closing and opening about the tire. Centering plates are provided to locate the tire concentrically within the mold and to form an internal pressure chamber within the tire. The internal pressure chamber is pressurized forcing the tire against the mold elements. Subsequently the outer chamber or chambers are pressurized to a pressure equal to the internal pressure. The centering or bead plates are then displaced from engagement with the tire. Heat is applied for bonding and shaping the tread stock to the tire casing.

In another embodiment, elastomeric diaphragms are used as mold elements and the bead plates remain stationary relative to one another.

In still another embodiment, a combination of metal matrices and elastomeric diaphragms are used as mold elements.

11 Claims, 14 Drawing Figures

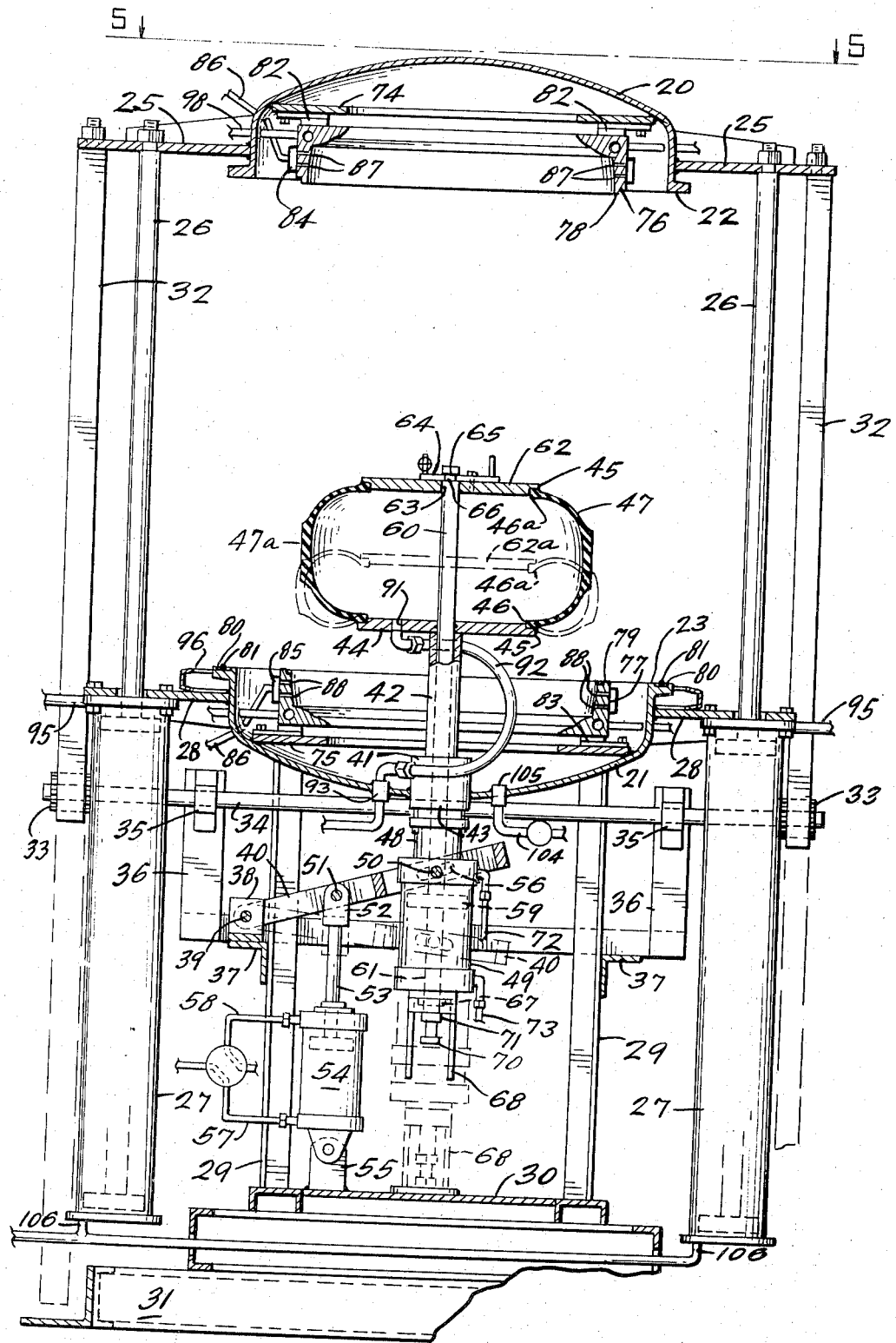
FIG-1-

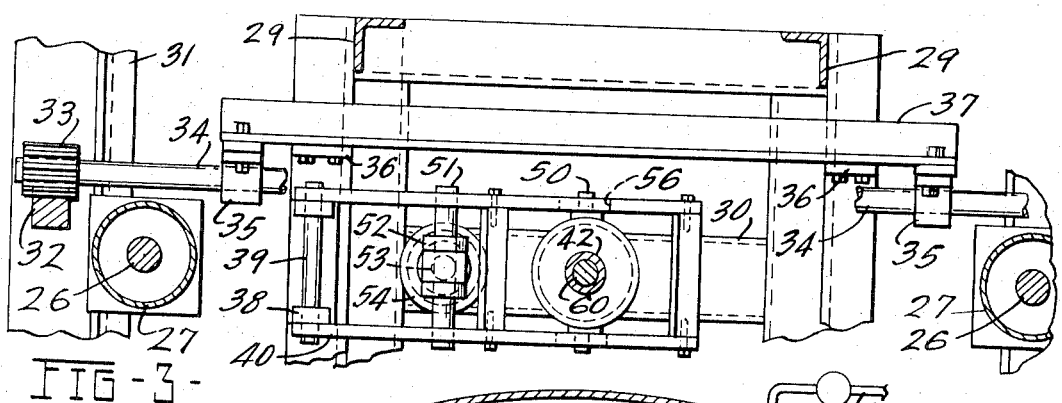
FIG-3-
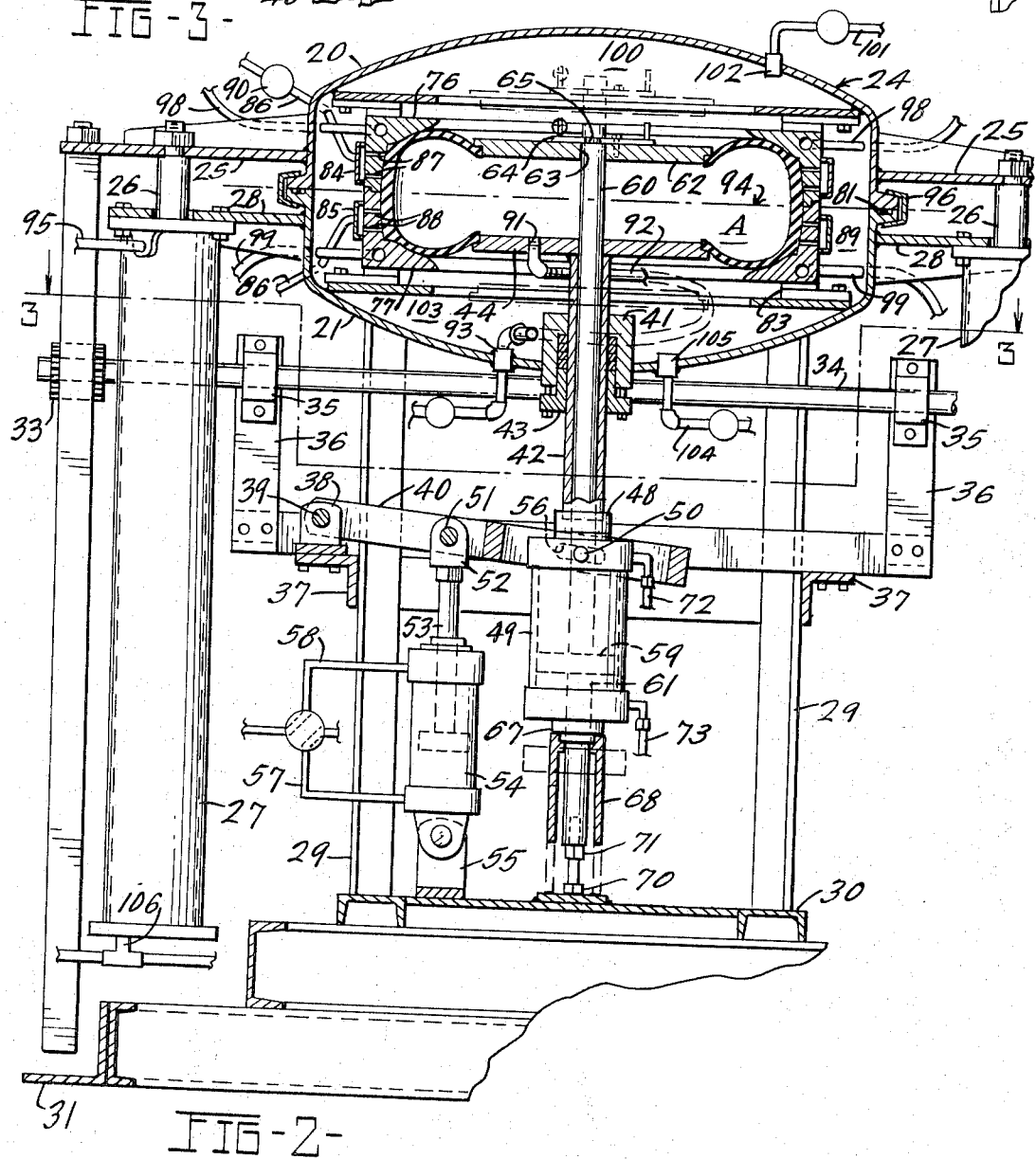
FIG-2-

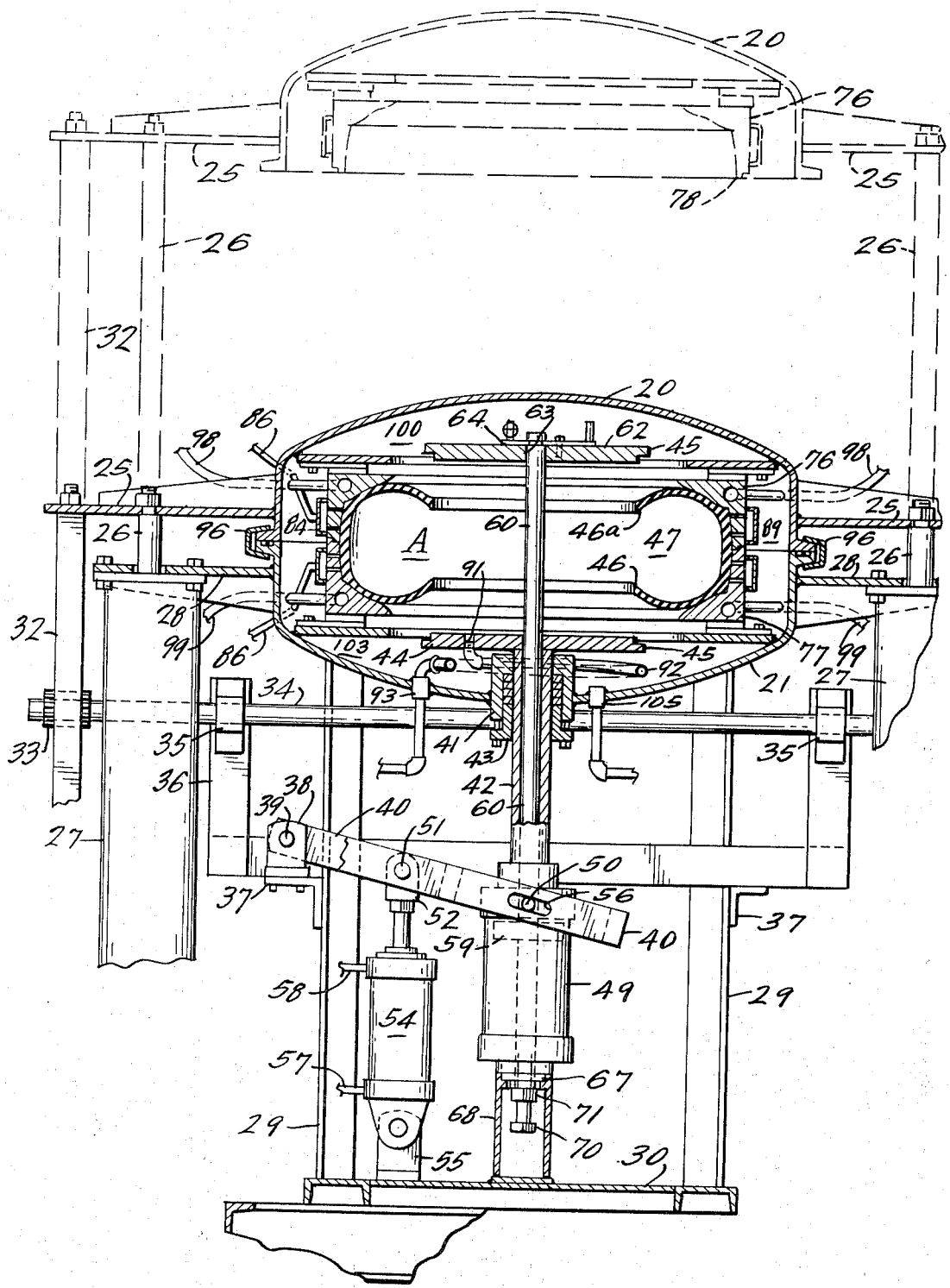
FIG-4-

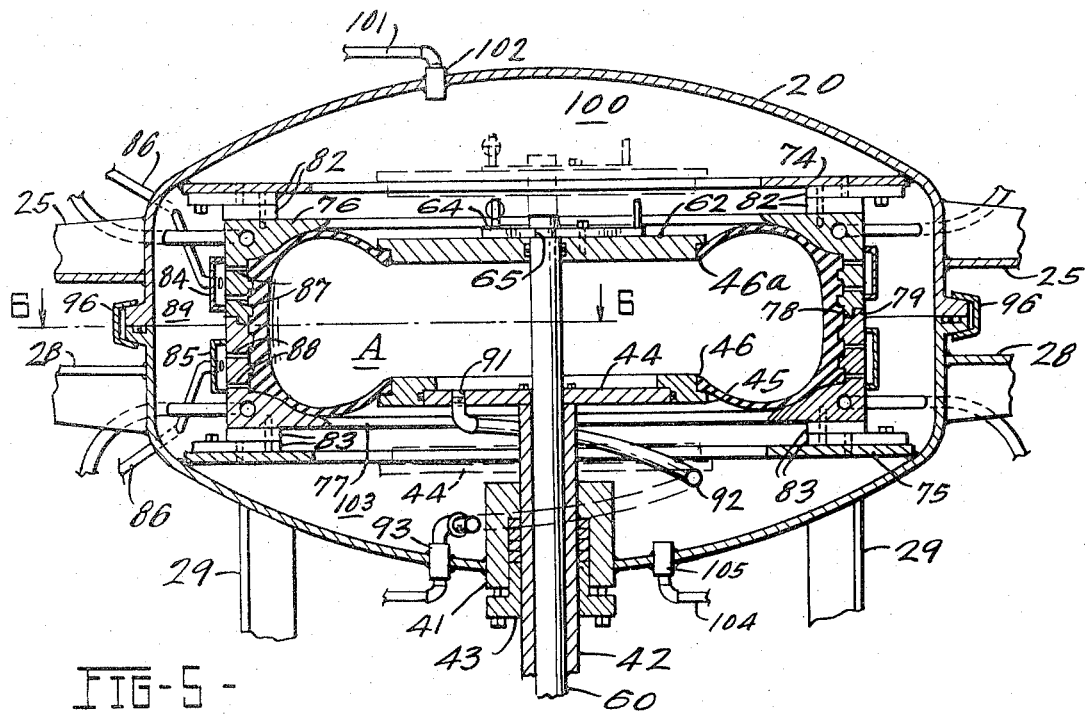
FIG-5-
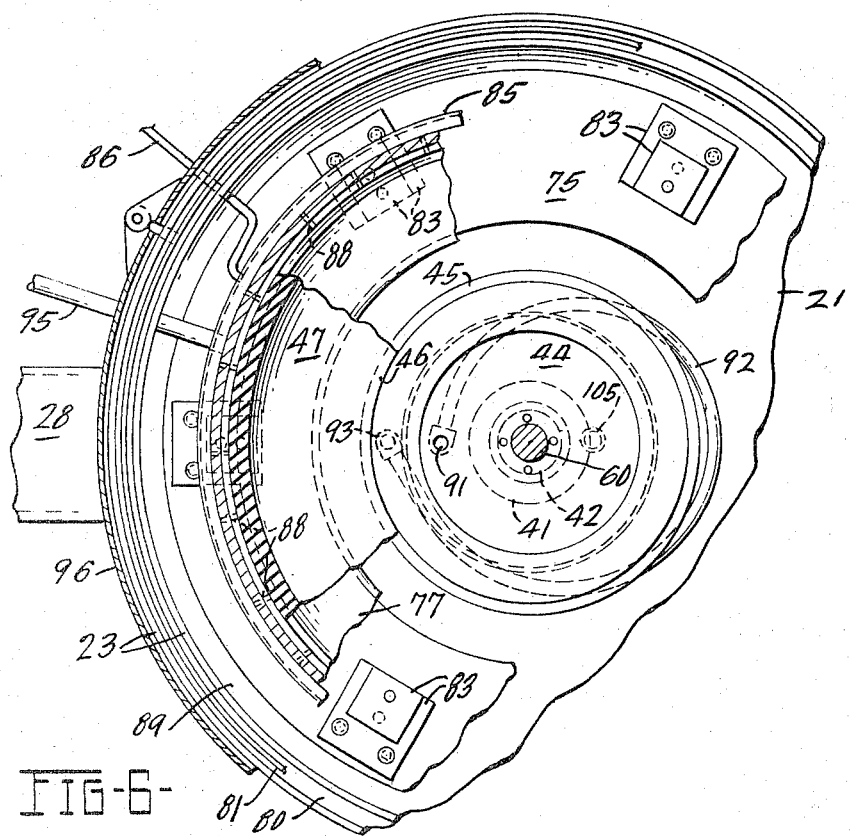
FIG-6-

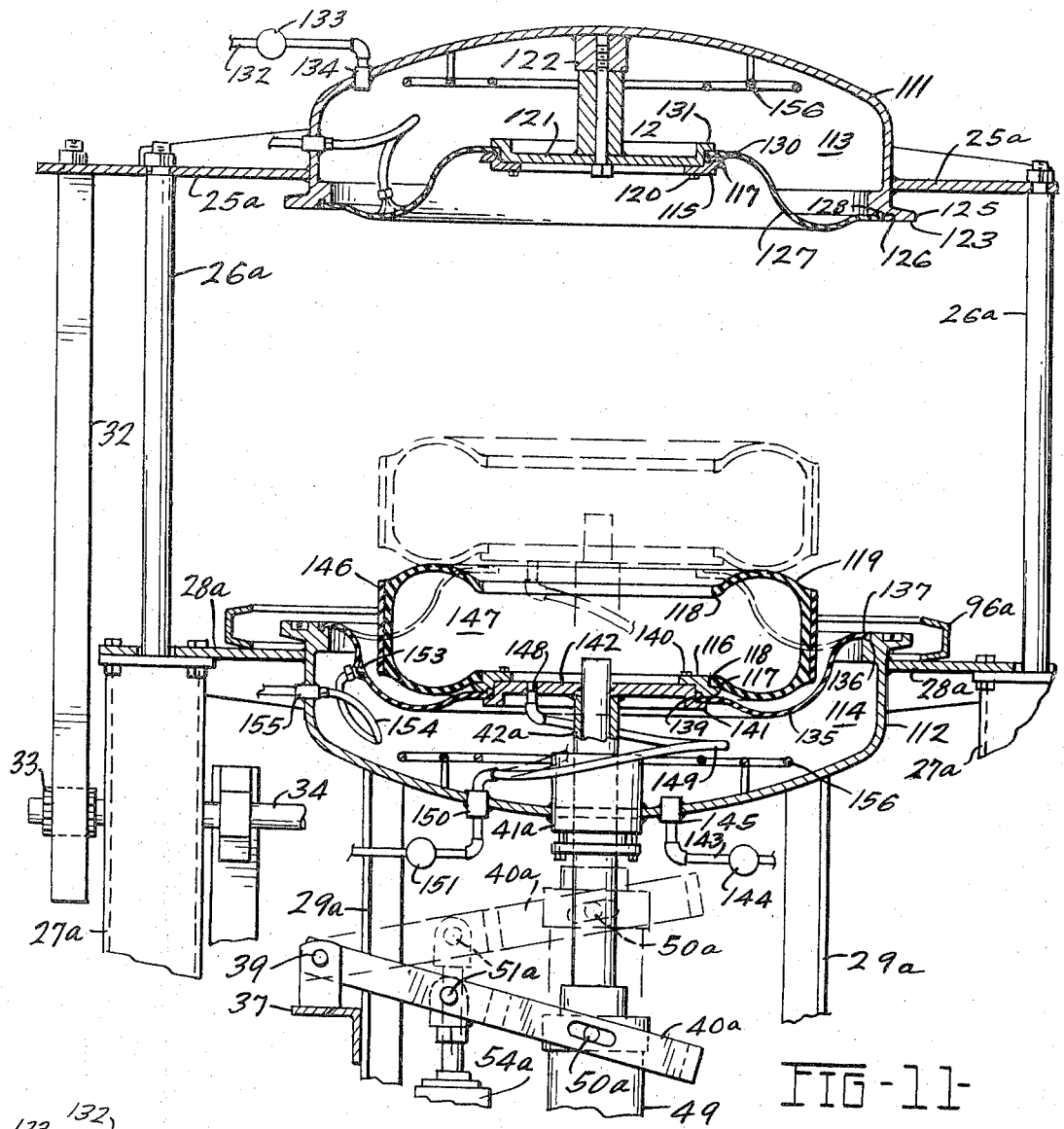
FIG-11-
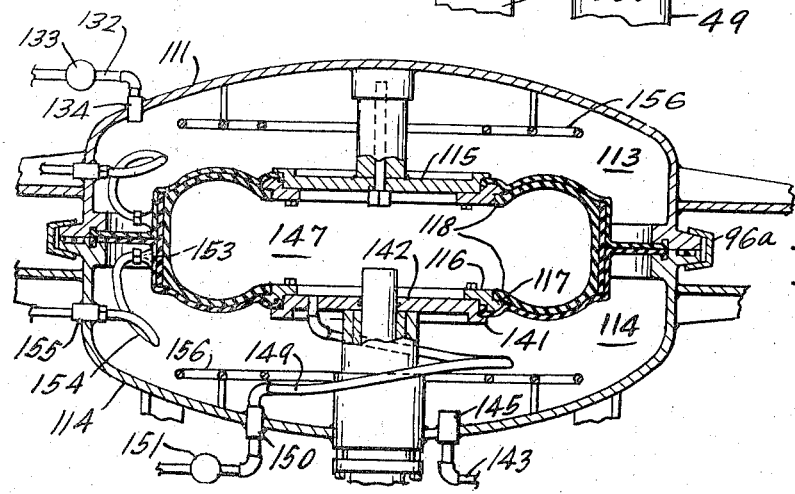
FIG-12-

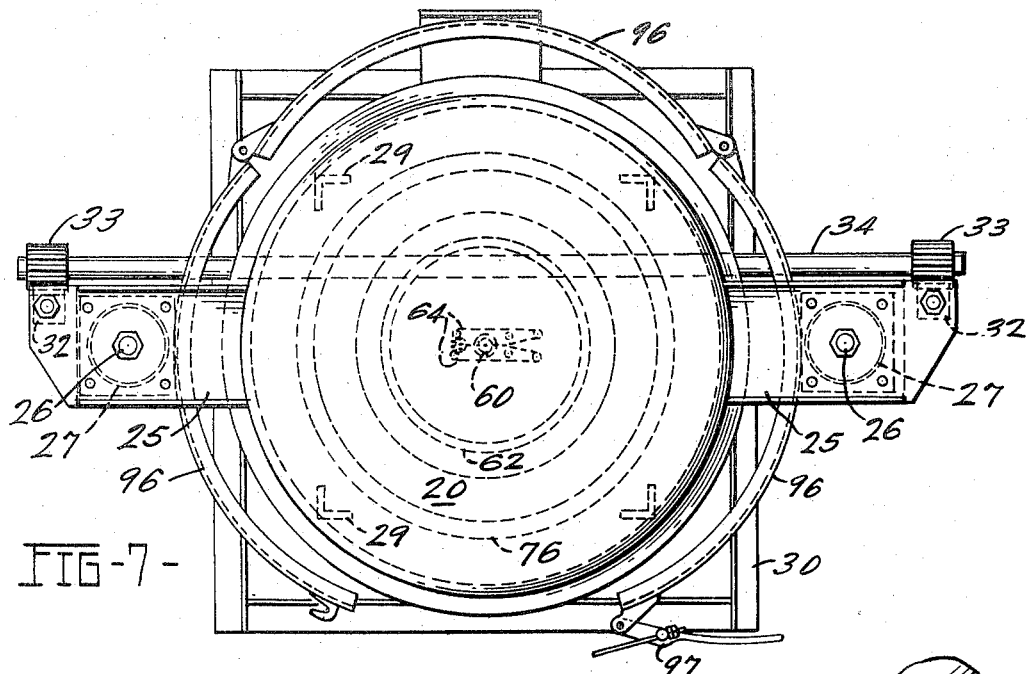
FIG-7-
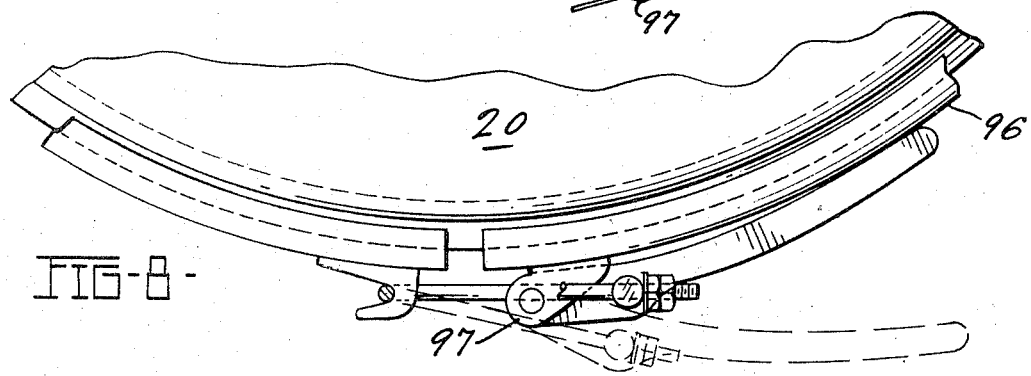
FIG-8-
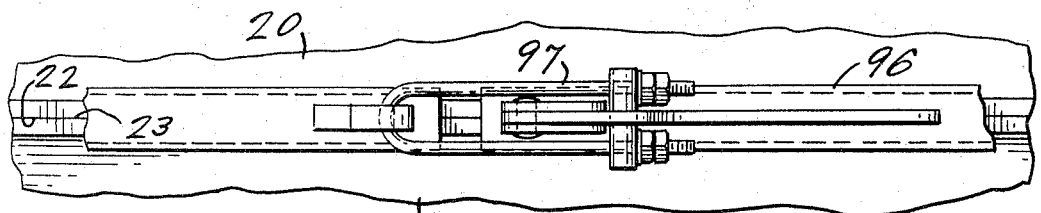
FIG-9-
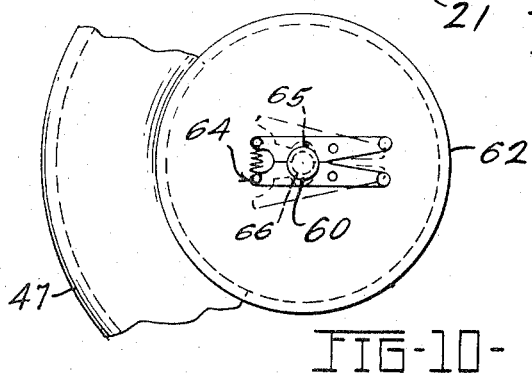
FIG-10-

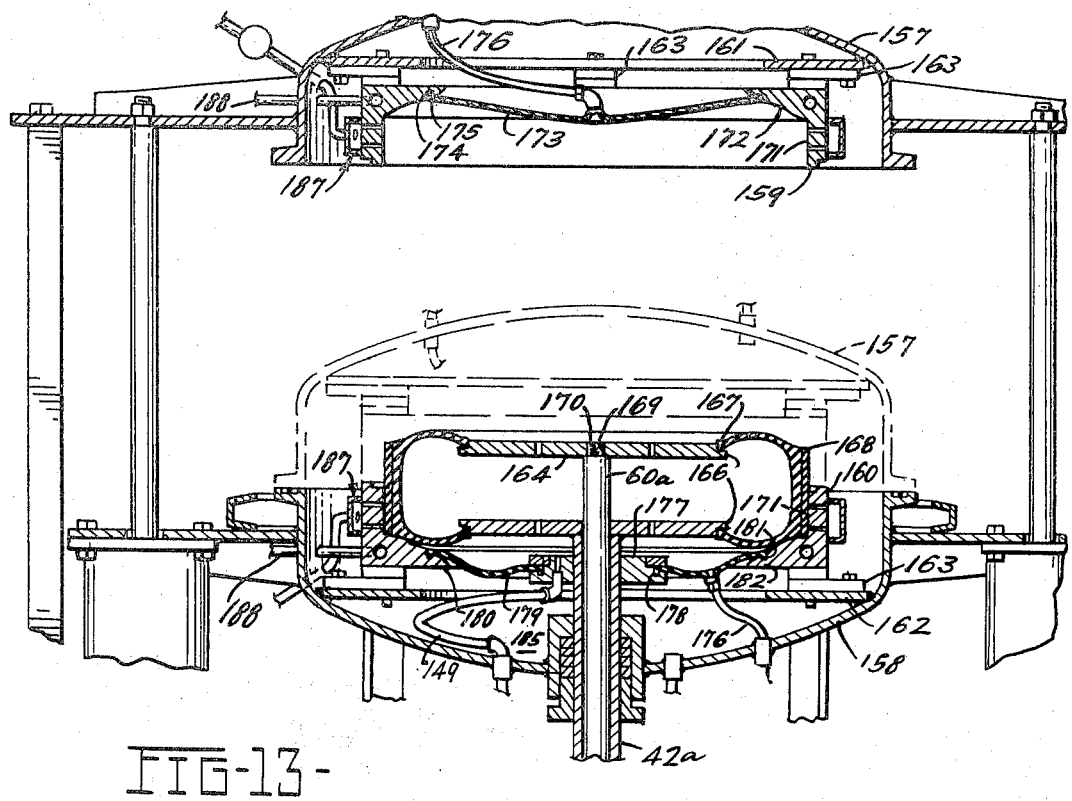
FIG-13-
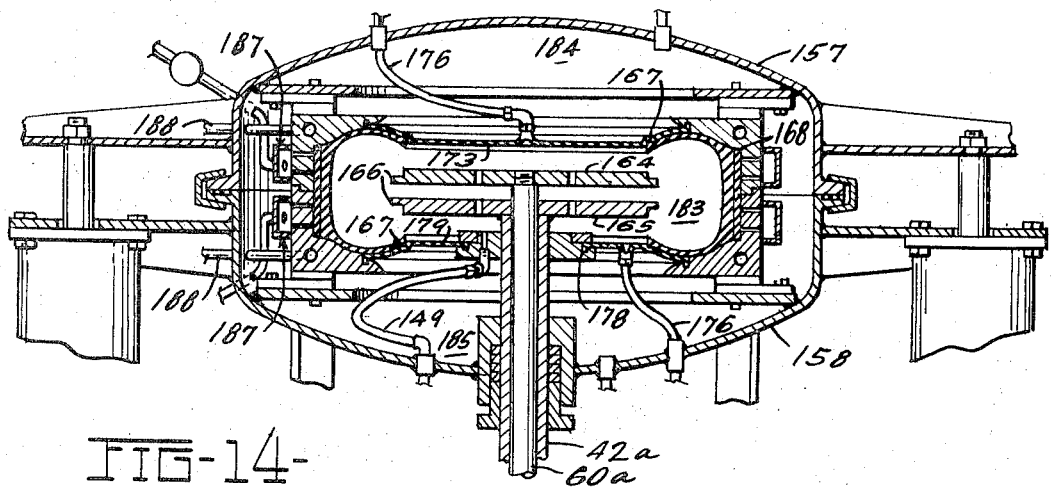
FIG-14-

3,853,666

METHOD AND APPARATUS FOR RETREADING TIRES

This is a division, of application Ser. No. 52,534 filed July 6, 1970 now U.S. Pat. No. 3,729,358.

BACKGROUND OF THE INVENTION

This invention relates to a method and apparatus for retreading tires. Prior art apparatus generally included mold forms which enclosed a portion of a tire casing. An inner curing tube, which consisted of an air-filled tube, was positioned within the apparatus to force the tire casing against the mold. In addition, a collapsible metallic curing rim was positioned within the tire over the curing tube. In an alternative method, a road type curing rim was used to directly hold the beads during curing. Such apparatus while being effective in reforming the tread area of the tire, often resulted in malforming the tread area. The road type rim often restricted the tire from assuming a correct position within the tire matrix. In addition, many sizes of curing rims were needed to handle various tire sizes.

The present invention contemplates reforming tread areas of tires at a much faster rate with a minimum of distortion of the bead and sidewall areas of the tires.

SUMMARY OF THE INVENTION

The present invention comprises a retreading method and apparatus which is much faster to use; eliminates the need for curing rims; and reduces overstretching and buckling of the tire cord bodies.

A tire casing including attached tire stock is positioned within mating halves of a matrix. A pair of opposed bead plates initially engage and support the tire beads and also form part of an inner air chamber within the tire casing.

Upper and lower shells surround the matrix and form an autoclave having an exterior pressure chamber adjacent the bead portions of the tire casing. Preferably, the section of the autoclave adjacent the tread portion of the tire is initially vented to atmosphere or a reduced pressure area so that air entrapped between the tire casing and the matrix may be removed.

The inner chamber is pressurized, forcing the tread area and tread stock closely against the matrix. The exterior chambers are then pressured until they equal the pressure of the inner chamber. The bead plates are moved away from the tire beads when the chamber pressures are substantially equal allowing the beads to float to a static condition.

Heating means, comprising electrical resistance heaters, steam, heated air, hot water or a combination of these means, are then energized or activated to cure the retread stock.

One of the objects of this invention is to provide a mechanism comprising a horizontally divided pressure chamber having a vertically movable upper portion adapted for sealing contact along a common dividing line against a stationary lower portion, and upper and lower mold elements associated respectively with the pressure chamber portions wherein a band of retread stock may be bonded and shaped to the periphery of a tire casing positioned within the mold elements after the chamber is closed and sealed.

Another object of this invention is to provide a pair of axially aligned centering or bead plates adapted to engage the bead portions of the tire and effectively locate the tire within the chamber to facilitate its central positioning within the mold halves during their enclosure about the tire.

Another object is to provide a mechanism for moving the bead plates axially relative to the tire to permit engagement of the outer edges of the plates with the inner edges of the beads of the tire to define an inner pressure chamber to permit disengagement of the plates from the beads to free the beads and sidewalls of the tire from extraneous restraint during the cure.

Another object is to provide exterior pressurized chambers adjacent the bead areas of the tire casing pressured to the pressure of the inner chamber.

Another object is to provide apparatus which correctly centers the tire casing and tread stock during the retreading operation.

Another object is to provide means within the chamber adapted to facilitate use of molds of varying depths and diameters to accommodate the retreading of tires of various sizes.

Another object is to provide a supply of heat to the molds for curing the retread stock to the tire casing.

Another object is to provide a supply of fluid pressure within the inner chamber and within the tire to compact the retread stock against the contours of the mold and to compact the tread area of the tire against the retread stock to facilitate a uniform bonding.

Another object is to provide mechanism for raising and lowering of the upper autoclave shell and the upper half of the matrix and for raising and lowering the bead plates.

Another object is to provide a pressure regulating and control means to vary the fluid pressures within the tire and within the chamber during the retreading operation.

Another object is to provide a mold comprising a novel flexible diaphragm means for constraining a tire casing and applied preformed tread stock without the use of a metallic matrix.

BRIEF DESCRIPTION OF THE DRAWINGS

FIG. 1 is a vertical cross-sectional view with parts broken away showing one embodiment of retreading apparatus according to my invention, with a tire to be retreaded being supported on bead plates;

FIG. 2 is a vertical cross-sectional view with parts broken away and with the mold parts and chamber elements of FIG. 1 shown in a closed position;

FIG. 3 is a cross-sectional fragmentary plan view taken along the line 3—3 of FIG. 2;

FIG. 4 is a fragmentary vertical cross-sectional view of the FIG. 1 apparatus with the centering or bead plates separated and removed from contact with the tires and with the molds closed in bonding and shaping position on the tire;

FIG. 5 is a fragmentary vertical cross-sectional view of a portion of the FIG. 1 apparatus on a slightly enlarged scale;

FIG. 6 is a fragmentary cross-sectional plan view taken along the line 6—6 of FIG. 5;

FIG. 7 is a plan view of the FIG. 1 apparatus showing the clamping ring in its disengaged position;

FIGS. 8 and 9 are plan and elevational views respectively of a toggle device adapted for locking the clamping ring;

FIG. 10 is a detail plan view of a fastening device arranged for securing one of the bead plates to a telescopic center post;

FIGS. 11 and 12 are fragmentary vertical cross-sectional views of another embodiment of the present invention in which a pair of flexible upper and lower diaphragms are utilized; and FIGS. 13 and 14 are fragmentary vertical cross-sectional views of still another embodiment of the present invention, particularly adapted to retreading both the tread area and a portion of the sidewall of a tire.

DESCRIPTION OF THE PREFERRED EMBODIMENTS

Referring to FIGS. 1 to 6, one embodiment of the invention comprises upper and lower shells 20, 21, having mating edges 22, 23, which may be brought together into conjoint relationship to form an autoclave chamber 24 as indicated in FIGS. 2 and 5. The upper shell 20 is provided with arms 25, which extend outwardly and are connected to a pair of piston rods 26 of pneumatic cylinders 27.

The lower shell 21 is provided with a pair of arms 28 which extend outwardly from the shell 21. The cylinders 27 are mounted on the arms 28. The lower shell 21 is provided with a plurality of legs 29 which are welded or otherwise secured to a platform 30 which in turn may be mounted on a base 31. The platform 30 serves as a support for certain parts of the apparatus actuating mechanism to be described below.

The upper arms 25 extending from the upper shell 20 mount a pair of depending racks 32, the teeth of which are in mesh with a pair of pinion gears 33 which are keyed to the ends of a transverse shaft 34. The shaft 34 is carried in bearing blocks 35 which are mounted on brackets 36 of framework 37 secured to the legs 29. The framework 37 also carries a bracket 38 which is fitted with a fulcrum pin 39 to which a yoked lever 40 is hinged.

The lower shell 21 is fitted with a center collar 41 which provides a center guide for an axially movable tubular column 42. A packing assembly 43 is bolted to the center collar 41. At the upper end of the column 42 there is affixed a circular bead plate 44 having a peripherally extending lip 45 adapted to engage the lower bead 46 of a tire 47 to be retreaded. The plate 44 acts as a centering means and as a leveler for the tire and as a portion of an inner pressure chamber.

The column 42 is affixed at its lower end to a coupling 48 extending from a vertically movable pneumatic cylinder 49 mounted above the platform 30. The cylinder 49 is carried on trunnion pins 50 mounted on the yoked lever 40. The lever 40 mounts a thrust pin 51 between the coupling 48 and the fulcrum bracket 38. A clevis 52 mounted on the upper end of a piston rod 53 is connected to the intermediate thrust pin 51. The piston rod 53 extends upwardly from a pneumatic cylinder 54 which is hingedly mounted on a bracket 55 which extends upwardly from the platform 30. Slots 56 (see FIG. 1) are formed in the yoke lever 40 to permit relative drift of the trunnion pins 50 during vertical movement of the column 42.

The cylinder 54 is provided with pneumatic feed lines 57, 58 which are utilized in vertically moving the column 42 and the attached bead plate 44.

The cylinder 49 includes a piston 59 and double extending piston rods 60, 61. The rod 60 extends through the coupling 48 and the telescopic column 42 to a height above the plate 44. An upper centering or bead plate 62 is mounted on the upper end of the rod 60 and engages the upper or opposite bead 46a of the tire 47. The plate 62 is provided with an opening 63 to permit vertical slidable engagement with the rod 60. The plate 62 mounts a spring biased locking clamp 64 (see FIG. 10) having a central recess portion 65 adapted to engage a groove 66 near the upper end of the rod 60.

An adjustment screw 70 at the lowermost end of the rod 61 (see FIG. 2) is used when matrices of a different width are placed in the autoclave 24 to insure correct vertical centering of the bead plates 44 and 62.

The lower piston rod 61 is adapted to pass downwardly from the piston 59 through a coupling 67. A spacer sleeve 68 is positioned below the coupling 67 and correctly centers the bead plates 44 and 62 when they are in the curing position. The adjustment screw 70 having a lock nut 71 is adapted to engage the base 30. The adjustment is utilized to adjust the position of the bead plates 44 and 62 to insure that the horizontal centerline of the plates 44 and 62 is identical with the parting line or horizontal centerline of the matrix when the plates 44 and 62 are in their curing position.

The sleeve 68 also limits the travel of the cylinder 49 and of the lower bead plate 44 when the plates 44 and 62 are moved to their open position.

The cylinder 49 is provided with pneumatic feed lines 72, 73 (see FIG. 1) which are utilized to move the piston 59, rod 60 and centering plate 62 vertically.

The shells 20, 21 are provided with horizontally disposed annularly shaped mold mounting plates 74, 75 (see FIG. 5). The plates 74, 75 are adapted to support a pair of tire mold elements or matrix halves 76, 77 in a substantially horizontal position and in concentric alignment with the bead plates 62, 44 respectively. The matrix halves have annular offset shoulders 78 and 79 to facilitate diametrical alignment of the molds at their parting line. The facing edge 23 on the lower autoclave shell 21 is provided with a groove 80 and suitable "O" ring seal 81. The mounting plates 74, 75 are fitted with replaceable spacer shims 82, 83 to accommodate molds of various heights. The shims 82, 83 may be adapted for adjustment radially on the plates 74, 75 to accommodate molds of various diameters.

Venting bands 84 and 85 are mounted on the upper and lower matrix halves 76, 77 respectively. Vent lines 86 are connected to the bands 84 and 85. The vent lines 86 communicate with the atmosphere.

The perimeters of the matrix halves 76, 77 are provided with vent holes 87, 88, respectively, which are designed to permit escape of air that would otherwise be entrapped within the molds when they are enclosed about a tire. The entrapped air thus may pass outwardly through the vents 87, 88 into the venting bands 84 and 85 which surround the mold elements 76, 77.

In another embodiment the bands 84 and 85 are not provided. Rather, the entrapped air is passed outwardly through the vents 87 and 88 into an annular space 89 surrounding the mold elements 76, 77. The space 89 is at a lower pressure. Prior to pressurizing the space 89 (as discussed below) retread stock is forced into the vent holes 87, 88 and at least partially cured. This closes the vent holes 87, 88 and prevents air from entering the vent holes 87, 88 during pressurizing of the space 89. preferably, a valve 90 is provided on the vent lines 86.

In the above embodiment, the space 89 is a part of an exterior chamber defined by the shells 20 and 21. In still another embodiment (not shown), seals are provided to separate the space 89 from exterior chambers in the shells 20 and 21. In this embodiment the space 89 is vented and preferably valved to atmosphere.

According to the present method, a tire to be retreaded is cleaned and buffed, minor blemishes are repaired, and much of the old original tread is removed and trimmed to a predetermined line to present a smooth peripheral surface upon which the retread stock is affixed. A coating of adhesive is applied to the periphery of the tire and tread stock is adhered to the tire casing. Various devices are available commercially for applying retread stock to a tire.

In accordance with the present invention, the upper plate 62 is first removed from its locked position on the rod 60 by opening the spring biased locking clamp 64. The tire casing 47, with a layer of retread stock 47a attached, is placed over and is supported by the lower centering bead plate 44. The plate 44 is provided with a port 91. A conduit 92 extends between an entrance collar 93 fixed to the wall of the lower shell 21 and the port 91. A valve (not shown) is provided to control fluid pressures. Initially, air of an inflating pressure is introduced through the port 91 and the upper bead plate 62 is pushed axially downwardly along the rod 60 until an air seal is formed and an inner air chamber A, defined by the upper and lower bead plates 44, 62 and the tire casing 47, begins to be pressurized. When the upper bead plate reaches the position shown in FIG. 1, the clamp 64 snaps into the locked position.

Referring to FIG. 1, during the initial step, the rod 60 is moved to its extreme upper position. The bead plates 44 and 62 are at their maximum spacing. As shown in FIG. 1, this reduces the outer circumference of the tire casing 47 to enable easy seating of the tire casing 47 within the lower matrix 77.

The inflated tire 47 is next lowered into contact with the mold half 77. Pressure is admitted to the cylinder 54 through the conduit 58 thereby lowering the lever 40, and the cylinder 49 associated therewith. This simultaneously lowers the column 42, rod 60 and plates 44, 62. Cylinders 27 are actuated to bring the upper shell 20 and upper matrix 76 downwardly to enclose the tire. The shoulder 78 is brought into register with the shoulder 79 to properly align the mold halves. The mating edges 22, 23 are likewise brought into correct alignment. A removable clamp ring 96 (see FIGS. 7-9) is provided for securing the matrix halves against separation. A toggle device 97 is provided to facilitate application and removal of the clamp ring 96. Pressure is then admitted through conduit 72 into the cylinder 49 thereby lowering the centering plate 62 to a correct vertical spacing with the lower plate 44 (see FIG. 4).

With the shells 20, 21 and the matrix halves 76, 77 closed about the tire 47, additional fluid pressure, for example 150 p.s.i. air, is admitted to the interior of the tire through the conduit 92 to expand the tire outwardly forcing the retread stock firmly against the interior surfaces of the molds (see FIG. 5). The pressure also forces any entrapped air within the molds outwardly through the vents 87, 88 into the vent bands 84, 85 from where it may escape through the vent lines 86 to the atmosphere.

In this embodiment, after a short period of time auxiliary fluid pressure is introduced to a space 100 in the upper shell 20 through a fluid conduit 101 having an entrance collar 102. Similarly, fluid pressure is introduced in a communicating lower space 103 through a conduit 104 having an entrance collar 105. The pressure inside the unitary exterior chamber consisting of spaces 89, 100 and 103 is increased to an amount substantially equal to the pressure within the interior chamber A. At this time, the plates 44 and 62 are separated as shown in FIG. 4.

When the supporting or bead plates 44 and 62 are removed from the bead areas of the tire 47, the beads are free to move to a static condition. It has been found that the tire beads have a "memory" and move to a correct bead positioning.

While the interior and exterior chambers are normally pressurized to 150 p.s.i., it has been found that this pressure may vary. The normal range is between 100 p.s.i. and 300 p.s.i. Pressures below 100 p.s.i. normally do not force the tire tread areas tightly against the matrix while pressures above 300 p.s.i. tend to permeate through the tire unless an air barrier layer is positioned along the inside wall of the tire casing.

Sufficient heat is then applied to cure the tire 47. The heating means may be, for examples, electrical resistance heating elements, heated air, or steam. In the present embodiment, heat is supplied by steam conduits 98, 99 which communicate with passages formed in the matrix halves. Normally, the curing temperature is between 275° and 325°F. It has been found that the total curing time using the method and apparatus according to the present invention is reduced significantly.

During curing, the tire is subjected to a relatively intense pressure in the tread area while the bead areas and sidewall areas of the tire adjacent the tread are subjected to little or no deformation from the procedure.

The pressure within the autoclave chamber 24 is then reduced to atmospheric. The toggle device 97 is released to permit removal of the clamp ring 96 from the mating edges of the shells 20 and 21.

Fluid pressure is introduced at the lower ends of the fluid cylinders 27 through conduits 106. The rods 26 associated with the cylinders 27 raise the upper shell 20 from contact with the lower shell 21. The retreaded tire 47 is then removed and the above procedure is repeated.

Another embodiment of the invention is shown in FIGS. 11 and 12. In this embodiment an annular band of stock having a preformed tread is cemented to the perimeter of a tire carcass and is vulcanized to the tire casing with pressure and heat. In the present apparatus, the metal matrix is eliminated and an elastomeric diaphragm is used.

The present embodiment includes an autoclave comprising a pair of upper and lower shell members 111 and 112 which cooperate with a flexible partitioning means and with fixed bead plates to form upper and lower sealed pressure chambers 113 and 114.

Tire centering rings 115 and 116 having shaped edges 117 adapted to engage the bead 118 of a tire 119 are provided. The upper ring 115 is secured by means of screws 120 to a supporting plate 121 which is bolted to a post 122 affixed to the shell 111.

The shells 111 and 112 are provided with upper and lower mating surfaces 123 and 124, respectively, adapted to form a pressure tight seal when closed. A clamp ring 96a is provided to preclude separation of the shells 111 and 112 while they are closed and subjected to internal pressure.

A circumferential groove 126 is defined along the lower edge of the shell 111 and receives an annular diaphragm 127. The diaphragm 127 is constructed of a rubberized or other type of flexible material, for example, a resin coated nylon fabric, and together with the bead plate 121 and shell 111 defines the chamber 113. The diaphragm 127 is provided at its outer perimeter with an upturned shoulder portion 128 which is cemented or otherwise secured in the groove 126. The inner perimeter of the diaphragm 127 is similarly configurated with a shoulder portion 130 which may be clamped into interlocking engagement between the periphery of the ring 115 and a lip 131 extending along the edge of the supporting plate 121.

Fluid pressure may be regulated to and from the pressure chamber 113 through a pressure conduit 132, 3-way valve 133 and an entrance collar 134 extending into the chamber through the shell 111.

A second flexible annular diaphragm 135 is provided to form a closure portion of the chamber 114. The outer perimeter of the diaphragm 135 has a down turned shoulder portion 136, which may be cemented or otherwise secured in a groove 137 formed in the mating face of the shell 112. The inner perimeter of the diaphragm 135 is provided with an upturned shoulder portion 139 adapted to be clamped by a plurality of screws 140 into interlocking engagement between the periphery of the lower ring 116 and a lip 141 extending along the peripheral edge of a lower supporting plate 142.

The plate 142 is welded or otherwise affixed to a tubular column 42a and is in vertical sliding engagement with a guide collar 41a mounted in the lower portion of the shell 112. The plate 142 may be raised and lowered within the chamber 114 by the action of a lever 40a, trunnion pins 50a, thrust pin 51a, pneumatic cylinder 54a, and other associated parts as disclosed above.

It has been found that in some situations where high pressures are used and where the tire casing is permeable, it is desirable to use a pressure tube (not shown) within the tire casing. In this embodiment, mating backing members (not shown) extend from the rings 115 and 116 and serve as a stop for the pressure tube to prevent the tube from spreading into the center of the tire casing rather than applying force on the tire body for the diaphragms 127 and 135 to press against.

Fluid pressure is supplied and regulated to and from the lower exterior pressure chamber 114 through a pressure conduit 143, 3-way valve 144 and entrance collar 145 which extends through the shell 112. The shell 112 is mounted on a plurality of legs 29a and is provided with arms 28a to which pneumatic cylinders 27a are affixed.

The shell 111 has outwardly extending arms 25a which are connected to piston rods 26a for imparting vertical movement to the shell 111.

In operation, a tire 119 has applied thereto by cement or other fastening means a strip of preformed retread stock 146, and is placed in a restive position on the lower centering plate 142, the lowermost of the beads 118 of the tire engaging the lip 117 on the lower ring 116.

The cylinders 27a are then activated to lower the shell 111 into engagement with the shell 112. The clamp ring 96a is then locked around the mating edges of the shells. The edges 128 and 136 of the diaphragms 127 and 135 are thereby held against disengagement from the shells (see FIG. 12). The upper and lower plates 121 and 142 are brought into contact with the tire beads 118 to form an inner pressure chamber 147 within the tire 119.

Fluid pressure of approximately 125 p.s.i. is introduced into the chamber 147 through an opening 148, a semi-rigid conduit 149, and an entrance collar 150 in the shell 112. A 3-way valve 151 or other means is provided to regulate the fluid pressure introduced into the chamber 147 within the tire. The degree of pressure introduced will depend largely on the type, size and quality of the tires being retreaded and will vary from 50 to 250 p.s.i. Simultaneously, the pressures in the chambers 113 and 114 are increased by introducing fluid under pressure through the conduits 132 and 143, thereby forcing the diaphragms 127, 135 into intimate and forceful contact exterior of the tire 119 and tread stock 146 as shown in FIG. 12.

The diaphragm 135 is provided with an outlet passage 153 connected to a semi-rigid conduit 154. The conduit 154 leads to an entrance fitting 155 mounted in the shell 112. Air which becomes entrapped between the diaphragms 127 and 135 as they are brought together to enclose the tire, may be withdrawn by suction means (not shown) through the conduit 154, or may be exhausted to the atmosphere. Fluid pressures within the chambers 113 and 114 and within the inner tire chamber are increased in substantially equal amounts to approximately 125 p.s.i. The tread stock 146 is thereby forcibly pressed against the perimeter of the tire, which, conversely, is pressed outwardly with an equal force. This relatively high pressure is maintained for a sufficient time period to insure bonding of the tread stock to the tire. Heating means, for example electrical resistance heaters 156, are positioned in the chambers 113 and 114 to raise the temperature within the chambers to approximately 200°F. to 300°F. during the bonding period. If desired, steam or other heating means (not shown) may be utilized.

Still another embodiment of the invention is shown in FIGS. 13 and 14. In this embodiment "retread" stock is placed not only on the tread area of the tire, but also on the sidewalls. A pair of upper and lower shell members 157 and 158 mount upper and lower matrix halves 159 and 160. Mold mounting plates 161, 162, and associated spacing plates 163 are provided to position the matrix halves 159 and 160 accurately within the shells 157 and 158. Upper and lower tire centering or bead plates 164 and 165 are provided with outwardly extending lips or edges 166 adapted to engage the inner or beaded edges 167 of a tire 168.

The upper bead plate 164 is provided with a threaded opening 169 adapted to engage a threaded stem 170 on a vertically movable rod 60a of the apparatus.

The matrix halves 159 and 160 are provided with inwardly facing substantially vertical wall portions 171 which conform generally to the contours of the tire being used. Inwardly directed flange portions 172 act to limit the final width of the tread and also to support at least in part the sidewall structure or casing of the tire. A flexible diaphragm 173 preferably of circular shape is adapted to enclose the otherwise open area extending across the diameter of the upper matrix half 159. The diaphragm 173 is provided with an upwardly directed rim portion 174 which engages and is preferably cemented into a circumferential groove 175 in the flange portion 172 of the upper matrix half 159.

The lower bead plate 165 is affixed, as by welding, to a vertically movable sleeve 42a carried by the apparatus. Suspended below the plate 165 and attached thereto is a collar 177 adapted to support the inner peripheral edge 178 of an annular diaphragm 179. The outer periphery of the diaphragm 179 is provided with a down turned rim portion 180 which engages a circumferential groove 181 in the flange portion 182 of the matrix half 160.

The diaphragm 179 is adapted to enclose the otherwise open annular area extending from the collar 177 outwardly to the flange portion 182 of the matrix half 160.

When the shells 157, 158 are brought into closed position, and the matrix halves 159 and 160 are enclosed about a tire, the diaphragms 173, 179 will divide the space within the shells into first, an inner space 183 (see FIG. 14) within the tire 168; secondly, an exterior chamber 184 above the diaphragm 173 next to the shell 157; and thirdly, an exterior chamber 185 below the diaphragm 179 and adjacent to the shell 158.

The tire initially is partially inflated through a fluid conduit 149 while supported by the centering bead plates 164 and 165. The pressure is then increased to approximately 150 p.s.i., forcing the tire 168 against the matrix halves 159 and 160. Vent openings 186 through the mold walls 171 are provided to permit the escape of air entrapped between the tire and mold walls. Vent conduits 176 are provided to permit the escape of air from between the diaphragms 173, 179 and the exterior surface of the tire casing. Vent band assemblies 187 are provided to conduct escaping air to the atmosphere.

During the initial loading, the bead plates 164 and 165 are moved to their maximum spacing to reduce the maximum diameter of the tire and facilitate the entry of the tire within the matrix halves 159 and 160. After the tire is properly seated, fluid pressure is simultaneously introduced into the exterior chamber consisting of the spaces 184, 185 through suitable fluid conduits to counterbalance the fluid pressure in the space 183.

The pressure in the three interior and exterior chambers is increased in substantially equal amounts. When the pressures are balanced, the bead plates 164 and 165 are moved vertically toward each other allowing the bead 167 of the tire 168 to float freely until it has reached its static condition.

At this time, heating means are activated to raise the interior and exterior chambers to a curing or bonding temperature of between 250°F. to 300°F. In the present embodiment, the heating means comprises a series of steam conduits 188 which communicate with passageways in the matrix halves 159 and 160.

The diaphragms 173 and 179 support the sidewalls of the tire 168 during the retreading operation.

After curing, the fluid pressures in the exterior and interior chambers are released to atmosphere. The shells 157, 158 are separated and the tire 168 removed from the mold.

What I claim is:

1. Apparatus for retreading tires comprising, in combination, a pair of mating shell members, a mold element mounted in each of said mating shell members, each of said mold elements comprising a rigid matrix and a flexible diaphragm supported by said rigid matrix, said mold elements being adapted to receive a tire to be retreaded, a tire engaging and centering means positioned within said mating shell members, said tire engaging and centering means and the tire defining an inner pressure chamber, means for pressurizing said inner pressure chamber, said mating shell members defining at least one exterior pressure chamber in opposed relationship to said inner pressure chamber and the interior of the tire, means for pressurizing said exterior pressure chamber, and heating means for raising the temperature within said mating shell members.

2. Apparatus according to claim 1, including means for opening the uppermost one of said mating shell members.

3. Apparatus according to claim 1, wherein said tire engaging and centering means includes spaced bead plates and means for moving at least one of said bead plates vertically relative to said other one of said bead plates.

4. Apparatus according to claim 1, including means for raising and lowering the uppermost one of said mating shell members.

5. Apparatus according to claim 4, including means for moving at least one of said bead plates vertically relative to said other one of said bead plates.

6. Apparatus for retreading tires comprising, in combination, a pair of mating matrix halves, said matrix halves being separable to receive a tire casing and tread stock, a flexible diaphragm connected to each of said matrix halves, a pair of opposed bead plates for supporting the bead of the tire casing and for forming together with the tire casing an inner pressure chamber, means for moving said bead plates to non-force transmitting positions adjacent the tire casing, shell means positioned adjacent said bead support means for defining with said flexible diaphragms at least one exterior pressure chamber adjacent the bead portions of the tire casing, means for pressurizing such inner pressure chamber and said exterior pressure chambers and means for heating said tire casing and said tread stock.

7. Apparatus according to claim 6, wherein said means for moving said bead plates include a telescopic column assembly having an inner rod and a coaxial outer tube, said inner rod mounting one of said bead plates and said outer tube mounting the other one of said bead plates, first cylinder means for vertically moving said telescopic column assembly and second cylinder means for moving said inner rod and said outer tube toward and away from one another, whereby said bead plates are moved toward and away from one another.

8. Apparatus according to claim 6, wherein said shell means comprise upper and lower mating shell members, and means for vertically moving said upper shell member toward and away from said lower shell member.

9. Apparatus according to claim 8, wherein said means for moving said upper shell member comprises at least one cylinder operatively connected to said upper shell member.

10. Apparatus according to claim 9, including guiding means for guiding the movement of said upper shell member comprising a pair of vertical racks connected to opposed sides of said upper shell member, a transverse shaft mounted adjacent said lower shell member, and opposed pinions mounted on said transverse shaft, each of said opposed pinions engaging a respective one of said racks.

11. Apparatus for bonding and shaping a layer of retread stock to the periphery of a tire, comprising a frame, a lower shell member mounted on the frame, a lower mold element comprising a rigid matrix and a flexible diaphragm and adapted to shape a correlative portion of said stock; an upper shell member adapted to cooperate with said lower shell member to form a pressure chamber, an upper mold element comprising a rigid matrix and a flexible diaphragm adapted to shape a correlative portion of said stock, heating means for heating said tire and tread stock; tire centering means mounted within said lower shell comprising spaced apart plates adapted to be engaged and disengaged with bead portions of said tire; means to inflate said tire within said chamber and to expand said tread area of said tire against said mold elements; fluid exhaust means associated with said mold elements and with at least one of said shells to permit removal of fluid from within said mold elements while said tire is being inflated therein, thereby insuring substantially solid contact of the tread stock on said tire with the shaping portions of said molds, and means for pressurizing the area exterior of said tire.

* * * * *